J. KARITZKY.
CONDUIT OR CABLE CLAMP AND BRIDLE RING.
APPLICATION FILED FEB. 16, 1920.
1,365,620.
Patented Jan. 11, 1921.
2 SHEETS—SHEET 1.
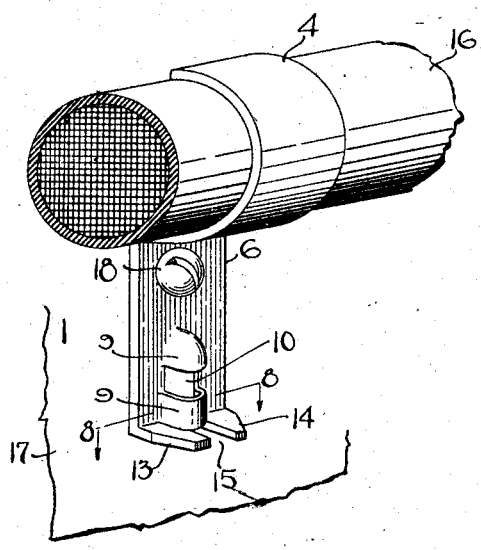
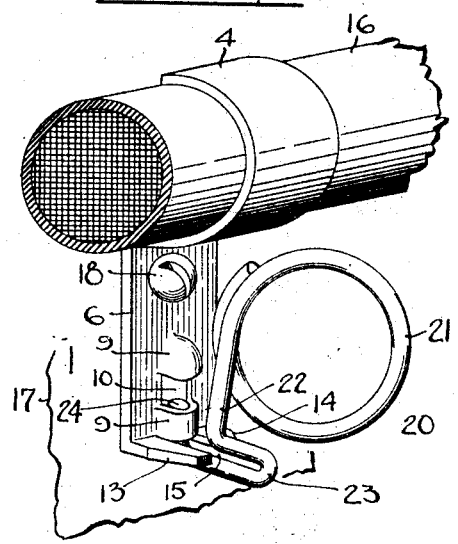
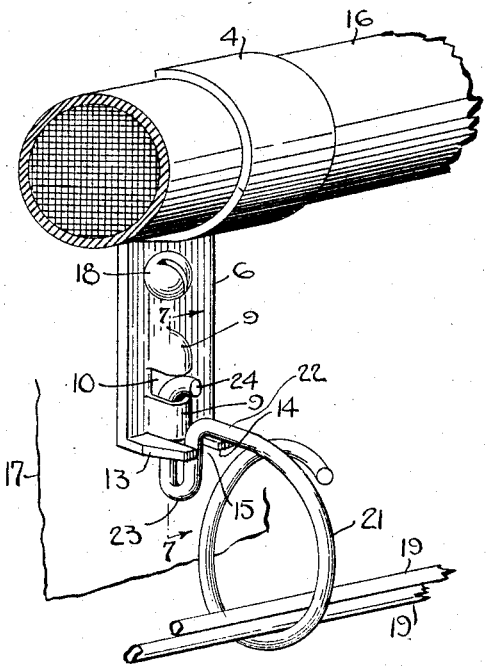
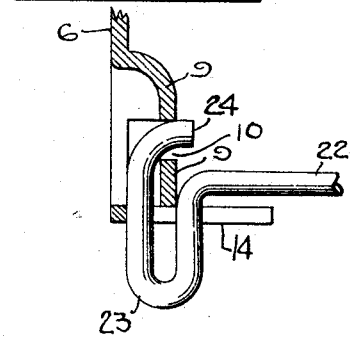
INVENTOR
John Karitzky
BY
Alan M Johnson
ATTORNEY J. KARITZKY.
CONDUIT OR CABLE CLAMP AND BRIDLE RING.
APPLICATION FILED FEB. 16, 1920.
1,365,620.
Patented Jan. 11, 1921.
2 SHEETS—SHEET 2.
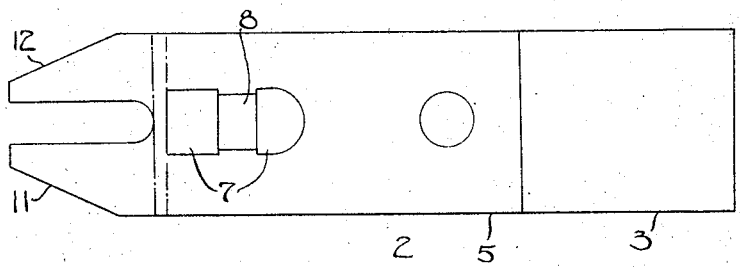
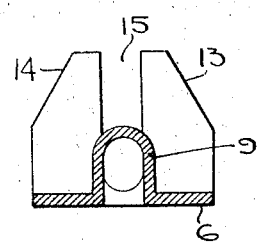
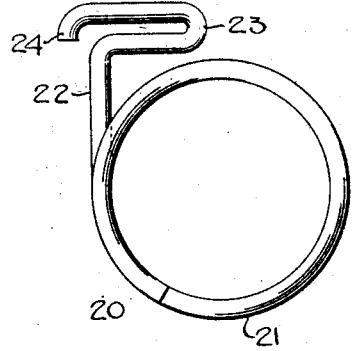
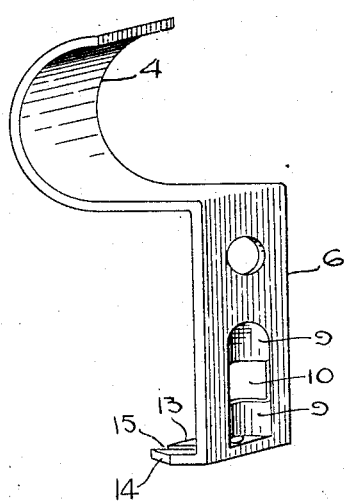

UNITED STATES PATENT OFFICE.

JOHN KARITZKY, OF GARWOOD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,620.  Specification of Letters Patent.  Patented Jan. 11, 1921.

Application filed February 16, 1920. Serial No. 359,122.

*To all whom it may concern:*

Be it known that I, JOHN KARITZKY, a citizen of the United States, residing at Garwood, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with locking means to permit a bridle ring, provided with coöperating locking means, to hook into the clamp from the bottom of said conduit or cable clamp.

My invention further relates to the combination of such a conduit or cable clamp and a bridle ring to coöperate with it.

While my conduit or cable clamp is preferably formed out of pressed sheet material as pressed steel, it may be formed from castings of malleable iron, brass, an alloy, aluminum or any other metal, or it may be made out of pressed fibrous material.

My invention further relates to certain combinations, sub-combinations, articles of manufacture, and details of construction, all of which will be more fully hereinafter described and pointed out in the claims.

In the figures, in which I have shown one embodiment of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1, and a bridle ring, in its first attaching position;

Fig. 3 is a perspective view of the conduit or cable clamp and bridle ring in its locked operative position, shown supporting runs of bridle wires;

Fig. 4 is a side elevation of my improved bridle ring;

Fig. 5 is a plan view of the blank form which the cable clamp is preferably stamped;

Fig. 6 is a perspective view of the conduit or cable clamp looking at the interior of the same;

Fig. 7 is a vertical section on the line 7—7 of Fig. 3 looking in the direction of the arrows;

Fig. 8 is a horizontal section on the line 8—8 of Fig. 1, looking in the direction of the arrows.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention I preferably, though not necessarily, form my conduit or cable clamp 1 from a blank 2, Fig. 5. In stamping or pressing this blank 2 the portion 3 of the blank becomes the hook portion 4 of the complete clamp, the portion 5 becomes the base 6, the portion 7, the socket or recess 9 which is preferably cut away at 8 Fig. 5, to form the eye or cut away portion 10, Fig. 1 of the complete clamp. The bifurcated ends 11 and 12 of the blank become the shoulders 13 and 14 with the slot 15 between them.

The cable 16 is supported on the wall or other suitable support 17 by means of the conduit or cable clamp and the screw 18.

Should it ever become necessary to increase the capacity of the installation by stringing runs of bridle wires 19, 19 this can be easily done by the lineman simply hooking my bridle ring 20 to the clamp without disturbing the cable 16 or the screw 18.

My preferred form of bridle ring 20 is formed out of wire and provided with a pig tail 21, a shank 22, a U-shaped member 23 bent back on the shank and in the same plane with the shank, the end of the U-shaped member being provided with a hook 24.

In positioning the bridle ring 20 the lineman passes the U-shaped member 23, Fig. 2, through the slot 15 to reach the bottom of the socket or recess 9. Then by simple manipulation the bridle ring is rocked or swung down from its position in Fig. 2, to its operative position Fig. 3. In doing this, however, the hook 24 projects out of the socket or recess 9 extending through the cutaway portion or eye 10, Fig. 3. In this position the walls of the opening or eye 10 prevent vertical movement of the bridle ring, and the shoulders 13 and 14, which are preferably, though not necessarily, used, prevent any rocking or rotation of the bridle ring so that it is firmly and securely locked to said conduit or cable clamp 1.

Should it ever be desirable to remove the runs of bridle wires 19, 19, and the bridle ring 20, this can be easily done, without interfering with the cable 16 or the screw 18, by simply bringing the bridle ring 20 from the position shown in Fig. 3 to that shown in Fig. 2; and then withdrawing the bridle ring from the clamp. In withdrawing the bridle ring no part is bent, marred or mutilated so that it can be used again with a similar clamp in another installation.

It will be noted that in my invention no tapping or screw threading of the conduit or cable clamp is required. This saves considerable labor and time in manufacture as well as reduces the amount of metal required in the cable clamp for such steps to be successfully performed. Nor does my bridle ring require to be screwthreaded, which still further reduces the cost of manufacture.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion and a base, the base being provided with a socket or recess extending longitudinally of the clamp provided with a cutaway portion or eye and open at the bottom to receive the shank of a bridle ring.

2. A conduit or cable clamp provided with a hook portion and a base, the base being provided with a socket or recess extending longitudinally of the clamp provided with a cutaway portion or eye open at the bottom to receive the shank of a bridle ring and one or more shoulders to coöperate with said bridle ring.

3. The combination of a conduit or cable clamp provided with a hook portion and a base, and with coöperating locking surfaces adapted to receive a bridle ring inserted from beneath the clamp and a bridle ring to coöperate with said locking surfaces.

4. The combination of a conduit or cable clamp provided with a hook portion and a base, the base being provided with a socket or recess extending longitudinally of the clamp and open at the bottom to receive the shank of a bridle ring and a bridle ring coöperating with said socket or recess.

5. The combination of a conduit or cable clamp provided with a hook portion and a base, the base being provided with a socket or recess extending longitudinally of the clamp and provided with a cutaway portion or eye, and a bridle ring having a shank provided with a U-shaped portion to coöperate with the socket, and with a hook to coöperate with the cutaway portion or eye of the socket.

6. A new article of manufacture comprising a bridle ring having a shank which in its normal position lies in a horizontal plane, the end of the shank being first bent down and then up to form a U-shaped member extending in a vertical plane, and a hook on the end of the U-shaped member closing the open portion of the U-shaped vertical member and extending in the general direction of the horizontal shank, the other end of the shank being bent back on itself to form an open ring.

JOHN KARITZKY.

Witnesses:
BERNARD C. KRANS,
WM. M. CROSS.